US012031711B2

(12) United States Patent
Barak

(10) Patent No.: US 12,031,711 B2
(45) Date of Patent: Jul. 9, 2024

(54) ILLUMINATED UTILITY HANDLE

(71) Applicant: Mohammed Zaher Barak, Watervliet, NY (US)

(72) Inventor: Mohammed Zaher Barak, Watervliet, NY (US)

( * ) Notice: Subject to any disclaimer, the term of this patent is extended or adjusted under 35 U.S.C. 154(b) by 72 days.

(21) Appl. No.: 18/059,637

(22) Filed: Nov. 29, 2022

(65) Prior Publication Data

US 2023/0167971 A1 Jun. 1, 2023

Related U.S. Application Data

(60) Provisional application No. 63/264,629, filed on Nov. 29, 2021.

(51) Int. Cl.

| | |
|---|---|
| ***F21V 33/00*** | (2006.01) |
| ***A46B 5/00*** | (2006.01) |
| ***A46B 15/00*** | (2006.01) |
| ***A47L 13/11*** | (2006.01) |
| ***A47L 13/24*** | (2006.01) |
| ***A47L 13/42*** | (2006.01) |
| ***F21V 23/04*** | (2006.01) |
| ***F21V 23/06*** | (2006.01) |
| *F21Y 103/10* | (2016.01) |
| *F21Y 107/30* | (2016.01) |
| *F21Y 115/10* | (2016.01) |

(52) U.S. Cl.

CPC ........ *F21V 33/0084* (2013.01); *A46B 5/0095* (2013.01); *A46B 15/0036* (2013.01); *A47L 13/11* (2013.01); *A47L 13/24* (2013.01); *A47L 13/42* (2013.01); *F21V 23/04* (2013.01); *F21V 23/06* (2013.01); *F21V 33/0004* (2013.01); *A46B 2200/202* (2013.01); *A46B 2200/302* (2013.01); *A46B 2200/3026* (2013.01); *F21Y 2103/10* (2016.08); *F21Y 2107/30* (2016.08); *F21Y 2115/10* (2016.08)

(58) Field of Classification Search

CPC ........................ F21V 33/0084; A46B 15/0036

See application file for complete search history.

(56) References Cited

U.S. PATENT DOCUMENTS 2,168,671 A * 8/1939 Garlington .............. F21V 33/00 15/105

4,916,773 A 4/1990 McCoy (Continued)

FOREIGN PATENT DOCUMENTS

WO WO-2019032516 A1 * 2/2019 ............. A47L 13/22

WO WO-2021163471 A1 * 8/2021 .............. A47L 11/04

*Primary Examiner* — Jeffrey O'Brien

(74) *Attorney, Agent, or Firm* — Dunlap Bennett & Ludwig, PLLC; Anna L. Kinney

(57) ABSTRACT

An illuminated utility handle is disclosed and is configured for coupling to various household work toss, such a broom, a mop, a paint brush/roller, a squeegee, or the like. The illuminated utility handle is formed as an elongate shaft having a proximal end and a distal end. The distal end has a coupling for securing the work tool to the illuminated utility handle and one or more lights disposed along the elongate shaft. The one or more lights are oriented to illuminate a work surface operated on by the attachment. A battery source may be carried in the handle and a power switch is operable to selectively activate the one or more lights. The battery source may be recharged by a charging port.

9 Claims, 4 Drawing Sheets

(56) References Cited

U.S. PATENT DOCUMENTS

| | | | | |
|---|---|---|---|---|
| 5,890,794 | A * | 4/1999 | Abtahi | F21K 9/00 362/267 |
| 6,213,621 | B1 * | 4/2001 | Chien | B25G 1/085 362/120 |
| 6,672,552 | B1 * | 1/2004 | Jao | A47H 1/142 248/254 |
| 6,854,163 | B1 * | 2/2005 | Ruana | B60N 3/02 116/1 |
| 6,869,118 | B2 | 3/2005 | Bradford | |
| 7,127,770 | B2 | 10/2006 | Clegg et al. | |
| 7,484,859 | B1 * | 2/2009 | Burke | F21V 33/0044 362/120 |
| 7,575,334 | B2 * | 8/2009 | Becnel | B43K 29/10 362/579 |
| 7,784,479 | B2 * | 8/2010 | Navarro | A45B 3/04 135/910 |
| 8,308,209 | B1 * | 11/2012 | Bibow | B25G 1/04 294/182 |
| 8,550,516 | B2 * | 10/2013 | Best | A01B 1/02 362/120 |
| D698,140 | S * | 1/2014 | Parker | D3/7 |
| 8,707,499 | B2 * | 4/2014 | Clark | B08B 1/00 15/105 |
| 8,985,802 | B2 * | 3/2015 | Nievas | A45B 3/02 362/184 |
| 9,079,759 | B2 * | 7/2015 | Walker | B67D 1/0874 |
| 9,238,246 | B2 * | 1/2016 | Surratt | B05C 17/0245 |
| 9,273,855 | B2 * | 3/2016 | Doble | F21V 21/22 |
| 9,414,669 | B2 * | 8/2016 | Fleischer | F21V 21/0885 |
| D785,839 | S * | 5/2017 | Anderson | D26/37 |
| 9,638,411 | B2 * | 5/2017 | Saltalamacchia | F21V 33/0056 |
| 10,119,232 | B2 * | 11/2018 | Herrera | A01B 1/02 |
| 10,154,727 | B2 * | 12/2018 | Fleischer | A46B 7/042 |
| 10,159,315 | B1 * | 12/2018 | Digiorgio | F21V 23/06 |
| 10,258,119 | B2 * | 4/2019 | Cox | F21V 33/0004 |
| 10,306,958 | B1 * | 6/2019 | Oligie | F21L 4/08 |
| 10,429,058 | B2 * | 10/2019 | Mckean | B25G 1/01 |
| 10,470,559 | B2 * | 11/2019 | Fleischer | A46B 15/0036 |
| 10,542,653 | B1 * | 1/2020 | Liversedge | H05B 3/48 |
| 10,631,600 | B2 * | 4/2020 | Moyo | A45B 3/02 |
| 10,675,748 | B2 * | 6/2020 | Angelo | H04R 3/12 |
| 10,750,853 | B1 * | 8/2020 | Wood | A46B 15/0044 |
| 10,779,620 | B1 * | 9/2020 | Johnson | F21L 4/08 |
| 10,794,669 | B1 * | 10/2020 | Gersznowicz | F21L 4/005 |
| 10,842,234 | B2 * | 11/2020 | Allan | B26B 19/46 |
| 10,863,879 | B2 * | 12/2020 | Cullins | F21V 21/0885 |
| 11,350,711 | B1 * | 6/2022 | Selman | A45B 9/00 |
| 11,391,456 | B2 * | 7/2022 | Jacobson | F21V 23/06 |
| 11,432,625 | B1 * | 9/2022 | Freeman | A45B 9/02 |
| 11,441,771 | B1 * | 9/2022 | Cindric | B25G 1/00 |
| 11,628,911 | B1 * | 4/2023 | Steele | F21V 21/14 114/221 R |
| 2002/0131267 | A1 * | 9/2002 | Van Osenbruggen | B23Q 17/2404 362/109 |
| 2004/0163667 | A1 | 8/2004 | Learman | |
| 2006/0215391 | A1 * | 9/2006 | Jones | A47L 13/20 362/91 |
| 2008/0205038 | A1 * | 8/2008 | Becnel | B25H 7/04 362/118 |
| 2009/0059569 | A1 * | 3/2009 | Quattrini, Jr. | A46B 15/0002 362/119 |
| 2013/0141899 | A1 * | 6/2013 | Lee | A45B 3/04 362/102 |
| 2015/0023008 | A1 * | 1/2015 | Milionis | F21V 33/0084 362/183 |
| 2016/0010849 | A1 * | 1/2016 | Snellenberger | F21V 23/04 362/119 |
| 2016/0052112 | A1 * | 2/2016 | Lemley, Jr. | B25B 23/18 362/119 |
| 2017/0138587 | A1 * | 5/2017 | Lu | F21V 33/0064 |
| 2018/0149351 | A1 * | 5/2018 | Wallace | F21V 33/0024 |
| 2019/0045997 | A1 | 2/2019 | Damaschke et al. | |
| 2019/0116942 | A1 * | 4/2019 | Allan | B26B 19/3826 |
| 2020/0032968 | A1 * | 1/2020 | Holden | F21V 23/04 |
| 2021/0071856 | A1 * | 3/2021 | Mitchell | F21V 21/116 |
| 2021/0251453 | A1 | 8/2021 | Howard et al. | |
| 2021/0401131 | A1 * | 12/2021 | Cheng | F21V 23/023 |
| 2023/0408081 | A1 * | 12/2023 | Fang | F21L 4/00 |

* cited by examiner

ILLUMINATED UTILITY HANDLE

CROSS-REFERENCE TO RELATED APPLICATION

This application claims the benefit of priority of U.S. provisional application No. 63/264,629, filed Nov. 29, 2021, the contents of which are herein incorporated by reference.

BACKGROUND OF THE INVENTION

The present invention relates to utility handles, such as those used for brooms, mops, dusters, paint rollers, and other household tools, and more particularly to illuminated utility handles.

Many household chores and projects can be challenging to perform due to an absence of illumination in some regions of the home. Sweeping, for example, is performed on a floor surface, and many areas of the floor may be dark due to overhanging cabinetry, chairs, tables, and the like.

Likewise, tasks such as dusting, particularly at higher elevations in a room, may need to be better illuminated due to the positioning of the lights.

For tasks like painting, the homeowner may remove or cover existing lighting so that it is protected from paint drips and splatters that invariably occur. Accordingly, light levels within the room may be better for applying a fresh coat of paint, particularly for ceilings and higher elevations of a wall surface.

As can be seen, there is a need for an improved utility handle with integrated illumination to make these tasks easier and illuminate a working space for a work head applied to the utility handle.

SUMMARY OF THE INVENTION

In one aspect of the present invention, a utility handle is disclosed that includes: an elongated main body defining a proximal end and a distal end configured to detachably couple to an attachment; a plurality of lights coupled to the main body; a power source for powering the plurality of lights.

In another aspect of the present invention, a utility handle is provided in combination with an attachment, and the utility handle includes: an elongated main body defining a proximal end and a distal end detachably coupled to the attachment; a plurality of lights coupled to the main body; a power source for powering the plurality of lights.

These and other features, aspects, and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
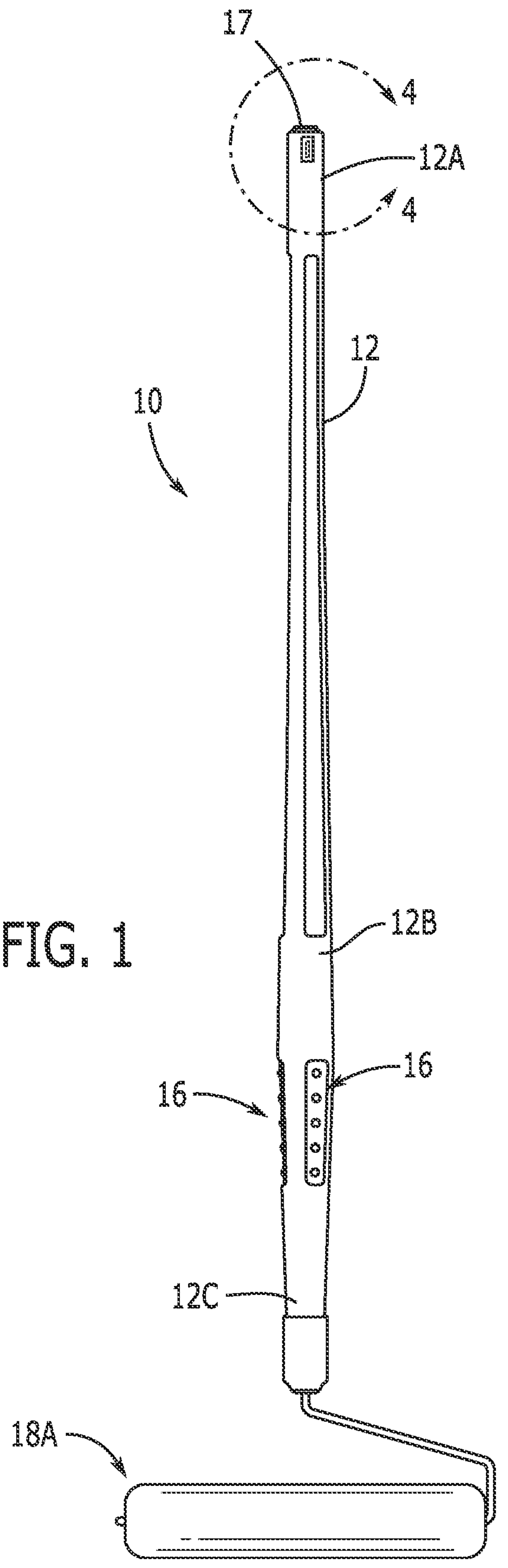
FIG. 1 is a top plan view of an embodiment of an illuminated utility handle with a paint roller attachment in accordance with the present invention.
Figure 2:
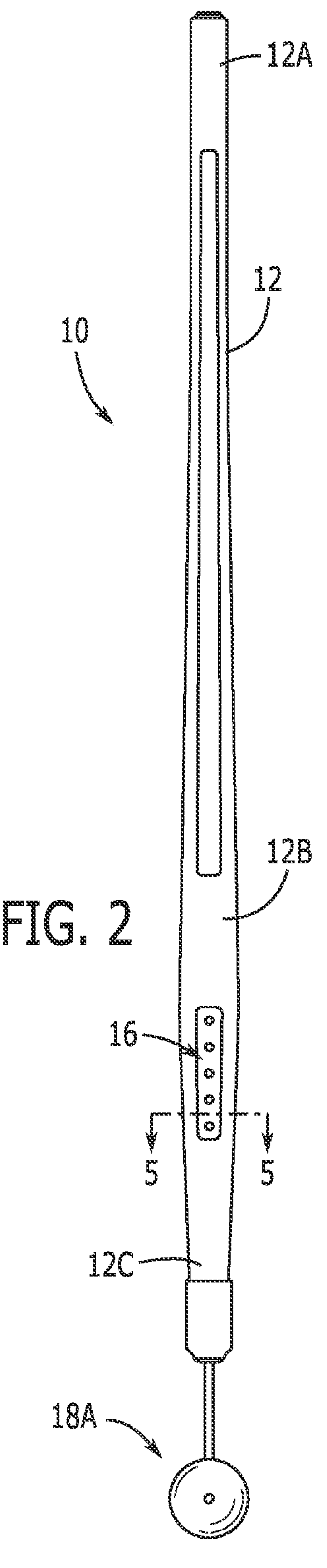
FIG. 2 is a side elevation view of the illuminated utility handle with a paint roller attachment.
Figure 3:
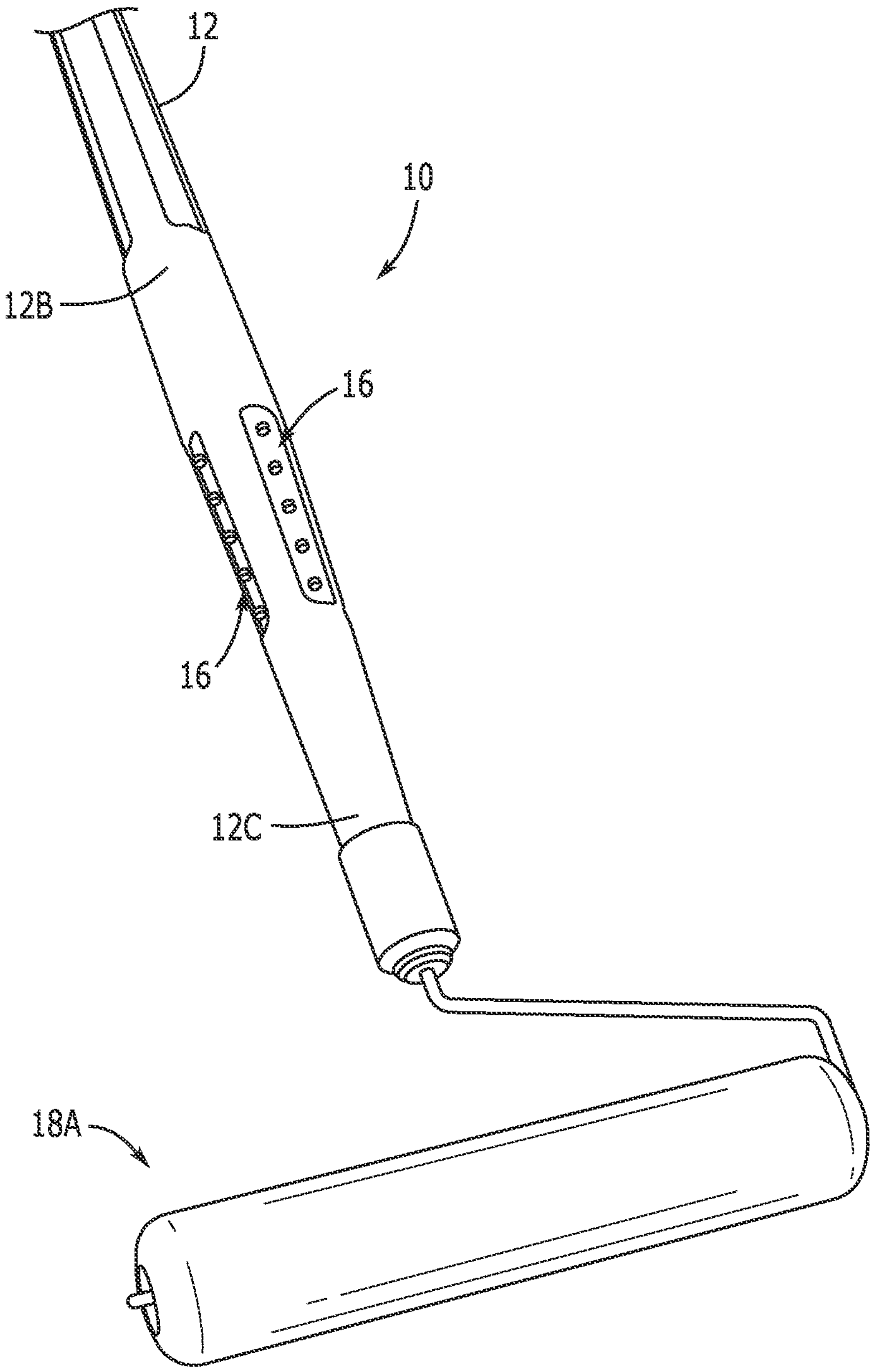
FIG. 3 is a detailed perspective view of a distal end of the illuminated utility handle with a paint roller attachment.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present invention has not been described in detail so that the present invention is not unnecessarily obscured.

Broadly, embodiments of the present invention provide an illuminated utility handle for attachment with household items, such as brooms, mops, dusters, paint rollers, and other household cleaning and maintenance tools.

Figure 4:
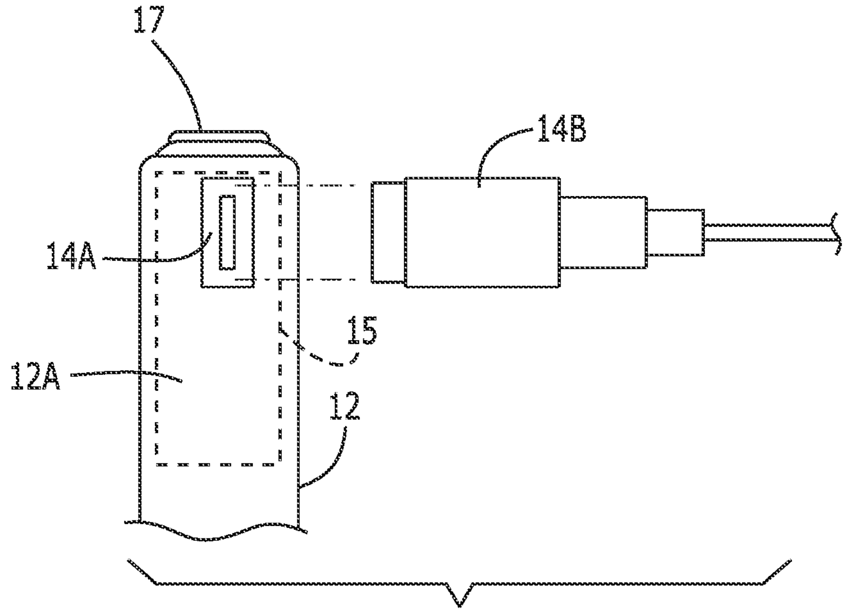
FIG. 4 is a detail exploded side elevation view of the illuminated utility handle with a paint roller attachment, indicated by line 4-4 of FIG. 1.
Figure 5:
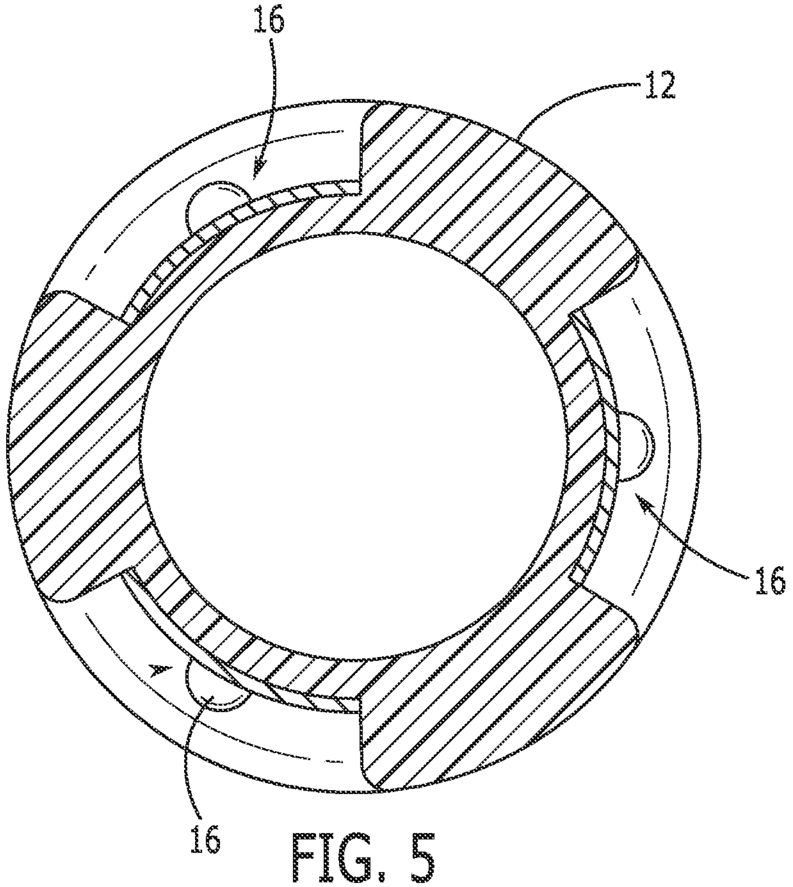
FIG. 5 is a detail cross-sectional view taken on line 5-5 of FIG. 2.
Figure 6:
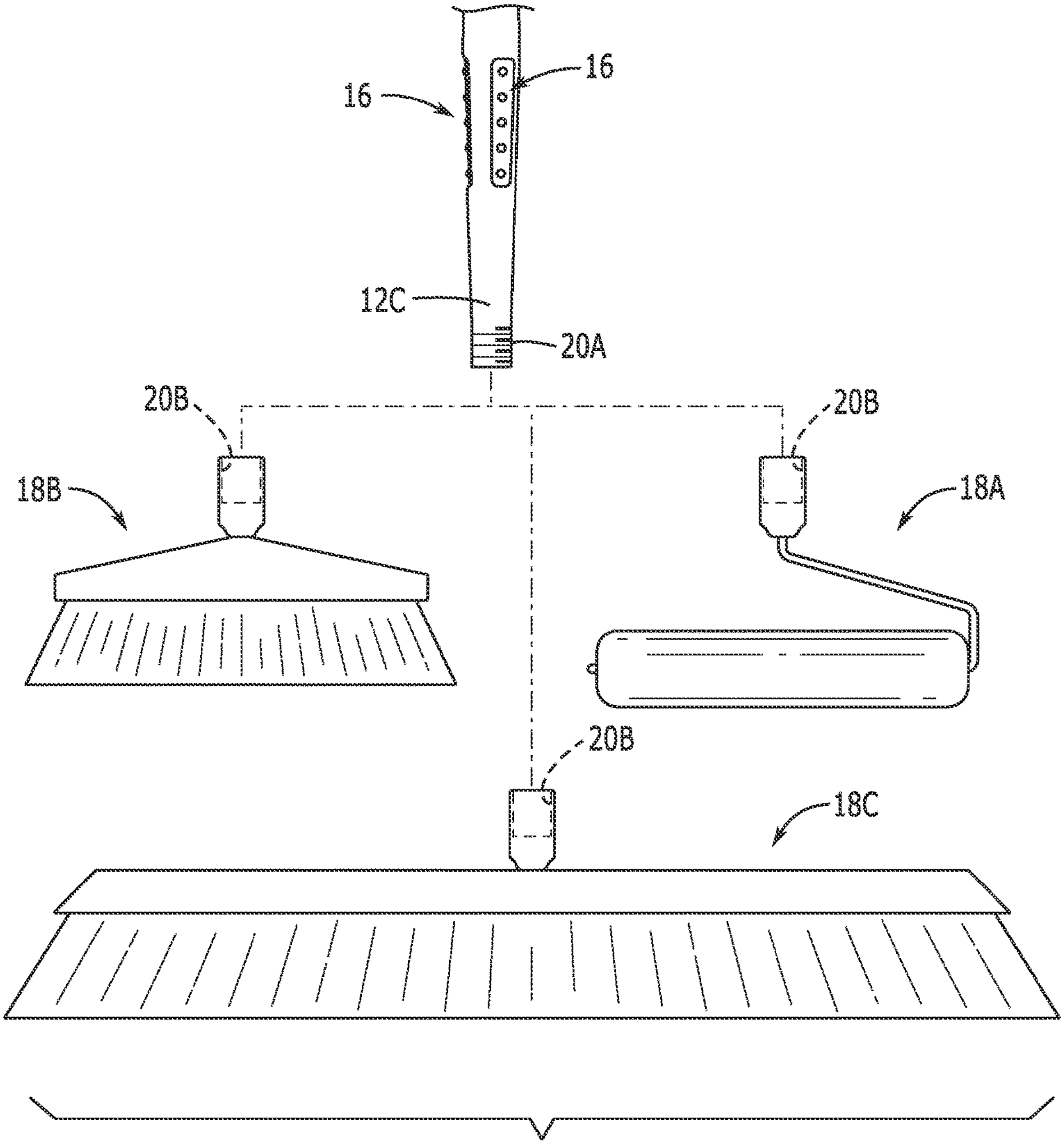
FIG. 6 is an exploded elevation view of the illuminated utility handle, showing various attachments therefor.

As seen in reference to the drawings of FIGS. 1-6, the present invention discloses a system 10 that includes an illuminated utility handle 12 formed as an elongated shaft 12 having a proximal end 12A, a main body 12B, and a distal end 12C. The user would grasp the proximal end 12A while utilizing an attachment that may be removably coupled at the distal end 12C. The length of the elongated shaft 12 may be selected based on the task performed. For a sweeping task, the length would be longer so that a broom attachment 18B, 18C can reach the floor surface while the user remains substantially upright. For a furniture duster, the length would be shorter so that the user could reach the top of a bookshelf without unnecessarily long handles that may strike other objects in the room. For a wall surface duster, the length may be like that of the broom so that the user can dust a ceiling fixture or reach cobwebs on the ceiling or the corners of the room. As depicted in FIG. 6, the attachment could also take the form of a paint roller 18A and the broom attachment can be varied in size (e.g., small 18B and large 18C).

The distal end has a coupling 20A, such as a threaded coupling, a pin, bolt, or screw for securing the attachment 18A, 18B, 18C to the illuminated utility handle 12 (via a complementary coupling 20B). The distal end has one or more lights 16 disposed along the elongate shaft. The one or more lights 16 are oriented to illuminate a work surface operated on by the attachment. In some embodiments, the one or more lights 16 may be movable to orient the lights on variations in the work surface and the operation of the attachment relative to the work surface. In some embodiments, the one or more lights may be disposed as an array 16 of lights disposed in a spaced apart relation along a length of the distal end of the elongate shaft. The array 16 of lights may be multiple light arrays 16 oriented at a differing radial offset from a longitudinal axis of the elongate shaft to illuminate one or more of a front, a back, a left side, and a right side of the illuminated utility handle. In some embodiments, the array of lights 16 are horizontal strips of light emitting diodes approximately two inches away from a tip of the distal end 12C. In the embodiment shown, the array 16 of lights is vertically aligned along the elongate shaft 12. The array 16 of lights may include three lights evenly spaced for efficient lighting around an operating direction of the broom. As shown in FIG. 5, the lights 16 may be positioned in recessed portions of the handle 12 for protection from damage.

The elongate shaft 12 may have a hollow interior or a channel through which a conductor is carried to the proximal end 12A of the illuminated utility handle 12. As shown in FIG. 4, a battery source 15 may be carried within the hollow interior. Preferably, the battery source 15 is carried towards the proximal end 12A of the handle 12 to provide for a better balance of the illuminated utility handle 12 and offset the weight of the attachment 18A, 18B, 18C carried at the distal end 12C.

A power switch 17 may be carried at the proximal end 12A and is operable by the user to selectively illuminate and extinguish the one or more lights 16. Preferably, the power switch 17 is incorporated with an end cap at the proximal end so that the power switch 17 is not inadvertently actuated by the user when carrying the illuminated utility handle 12 to perform a work task.

A charging port 14A may be provided at the proximal end 12A and is connectible with a power charger 14B to replenish the battery source 15 as it becomes depleted. By way of non-limiting example, the charging port 14A may be a USB charging port so that the illuminated utility handle 12 may be conveniently charged without requiring a dedicated or proprietary charger and charging cable.

As will be appreciated, the attachment may include a variety of work tools to perform household tasks. The attachment may include a Duster, a Mop Head, a Push Broom, a Paint Brush/Roller, a squeegee, and the like for any of multiple household tasks, as exemplified by FIG. 6.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A utility handle comprising:

an elongated main body defining a proximal end and a distal end configured to detachably couple to an attachment, the elongated main body comprising a plurality of axially-elongated recesses radially spaced around a circumference proximal the distal end;

a plurality of elongated light strips each comprising a plurality of lights coupled to the main body, each elongated light strip is embedded in a corresponding one of the plurality of axially-elongated recesses;

a power source for powering the plurality of lights.

2. The utility handle of claim 1, wherein the plurality of light strips are a plurality of strips of light emitting diodes.

3. The utility handle of claim 1, wherein the power source is embedded in the proximal end.

4. The utility handle of claim 3, further comprising a charging port, wherein the power source is a rechargeable battery that is charged via the charging port.

5. The utility handle of claim 3, further comprising a power button for selectively turning on and off the plurality of lights.

6. A utility handle in combination with an attachment, the utility handle comprising:

an elongated main body defining a proximal end and a distal end detachably coupled to the attachment, the elongated main body comprising a plurality of axially-elongated recesses radially spaced around a circumference proximal the distal end;

a plurality of elongated light strips each comprising a plurality of lights coupled to the main body, each elongated light strip is embedded in a corresponding one of the plurality of axially-elongated recesses;

a power source for powering the plurality of lights.

7. The utility handle in combination with the attachment of claim 6, wherein the attachment is one of a duster, a mop head, a broom, a paint brush, a paint roller, or a squeegee.

8. The utility handle in combination with the attachment of claim 6, wherein the power source is embedded in the proximal end.

9. The utility handle in combination with the attachment of claim 8, further comprising a power button for selectively turning on and off the plurality of lights.

* * * * *